United States Patent [19]
Huang

[11] Patent Number: 6,115,429
[45] Date of Patent: Sep. 5, 2000

[54] DATA RECEIVING METHOD FOR RECEIVING DATA THROUGH PREDETERMINED CLEAR ZONES OF A POWERLINE

[76] Inventor: Shih-Wei Huang, 4F, No. 4, Alley 7, Lane 283, Sec. 3, Roosevelt Road, Taipei, Taiwan

[21] Appl. No.: 08/511,210

[22] Filed: Aug. 4, 1995

[51] Int. Cl.[7] .................................................. H04L 25/06
[52] U.S. Cl. ...................... 375/317; 375/316; 340/310.01
[58] Field of Search .................................... 375/317, 353, 375/316; 340/310.01, 310.04

[56] References Cited

U.S. PATENT DOCUMENTS

| | | |
|---|---|---|
| 4,200,862 | 4/1980 | Campbell et al. . |
| 4,769,760 | 9/1988 | Kroll et al. ............................ 375/317 |
| 5,005,187 | 4/1991 | Thompson . |

Primary Examiner—Stephen Chin
Assistant Examiner—T. Ghebretinsae

[57] ABSTRACT

A data receiving method used in a powerline environment is used for converting a modulated signal received from a powerline over a data period within a predetermined clear zone after one zero crossing point of the powerline into a data bit. Each data period includes at least one predetermined bit period. The modulated signal is received within the bit period of one data period. The method includes: detecting zero crossing points of the powerline and generating a SYNC signal when a zero crossing point is detected; converting signals contained within the bit period of a data period after each SYNC signal into digital samples; generating an adaptive threshold according to the digital samples converted from the bit periods of a plurality of data periods; and converting the digital samples converted from the modulated signal into the data bit by using the adaptive threshold.

21 Claims, 8 Drawing Sheets

DATA RECEIVING METHOD FOR RECEIVING DATA THROUGH PREDETERMINED CLEAR ZONES OF A POWERLINE

BACKGROUND OF THE INVENTION

1. Field of the Invention

This invention relates to a data receiving method used in a powerline environment, and more particularly, to a data receiving method and apparatus for receiving data from predetermined clear zones of a powerline.

2. Description of the Prior Art

Data communications methods used in a powerline environment have been discussed in many prior articles. One major data communications method is disclosed in U.S. Pat. No. 4,200,862 to Campbell et al, issued on Apr. 29, 1980. This invention discloses a powerline data communications method which uses a number of pulses generated within a predetermined clear zone of a powerline to transmit a digital data. Each pulse comprises a number of carrier cycles and the number of carrier cycles contained in each pulse defining its logic value. For example, a pulse which contains 48 to 160 cycles is interpreted by a receiver as a logic 0 and a number greater than 160 is interpreted as a logic 1. The problem with this method is that if the powerline comprises some noises which are close to the carrier frequency, the noises may couple with the carrier signals and cause many data errors in the receiving end. Besides, periodic noises are constantly existed in a powerline environment. If the frequencies of some periodic noises are close to the carrier frequency, many carrier signals will be corrupted by these periodic noises and the transmission efficiency will drop dramatically. Such weakness makes this technique become noise dependent.

SUMMARY OF THE INVENTION

It is therefore the goal of the present invention, by overcoming the limits of the prior art, to devise a data receiving method for a powerline environment to achieve the follow objects:

1. To provide a data receiving method which is not noise dependent.
2. To provide a data receiving method which can handle periodic noises.

Briefly, in a preferred embodiment, the present invention includes a receiver for converting a modulated signal received from a media having a periodic wave into a data bit, a predetermined data period within each wave period of the periodic wave being used for data communications, each data period comprising at least one predetermined bit period and the modulated signal being received within said bit period of one data period, the receiver comprising:

(1) synchronization means for synchronizing the periodic wave and generating a SYNC signal when a wave period is detected;

(2) a signal converter for converting signals contained within said bit period of a data period after each SYNC signal into digital samples;

(3) threshold means for generating an adaptive threshold according to the digital samples converted from said bit periods of a plurality of data periods; and (4) data detecting means for converting the digital samples converted from said modulated signal into the data bit by using the adaptive threshold.

It is an advantage of the present invention that the adaptive threshold does not rely on a fixed carrier frequency in generating the data bit and thus become noise independent.

It is another advantage of the present invention that the adaptive threshold is generated according to the digital samples converted from said bit periods of a plurality of data periods, periodic noises existed in said bit period are calculated and integrated into the adaptive threshold and thus will be filtered out by the adaptive threshold.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
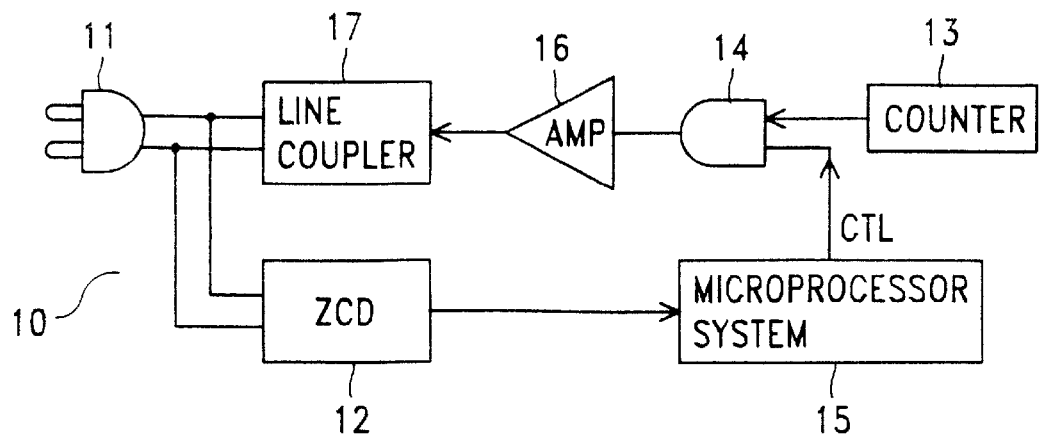
FIG. 1 is a circuit diagram of a powerline transmitter according to the present invention.
Figure 2:
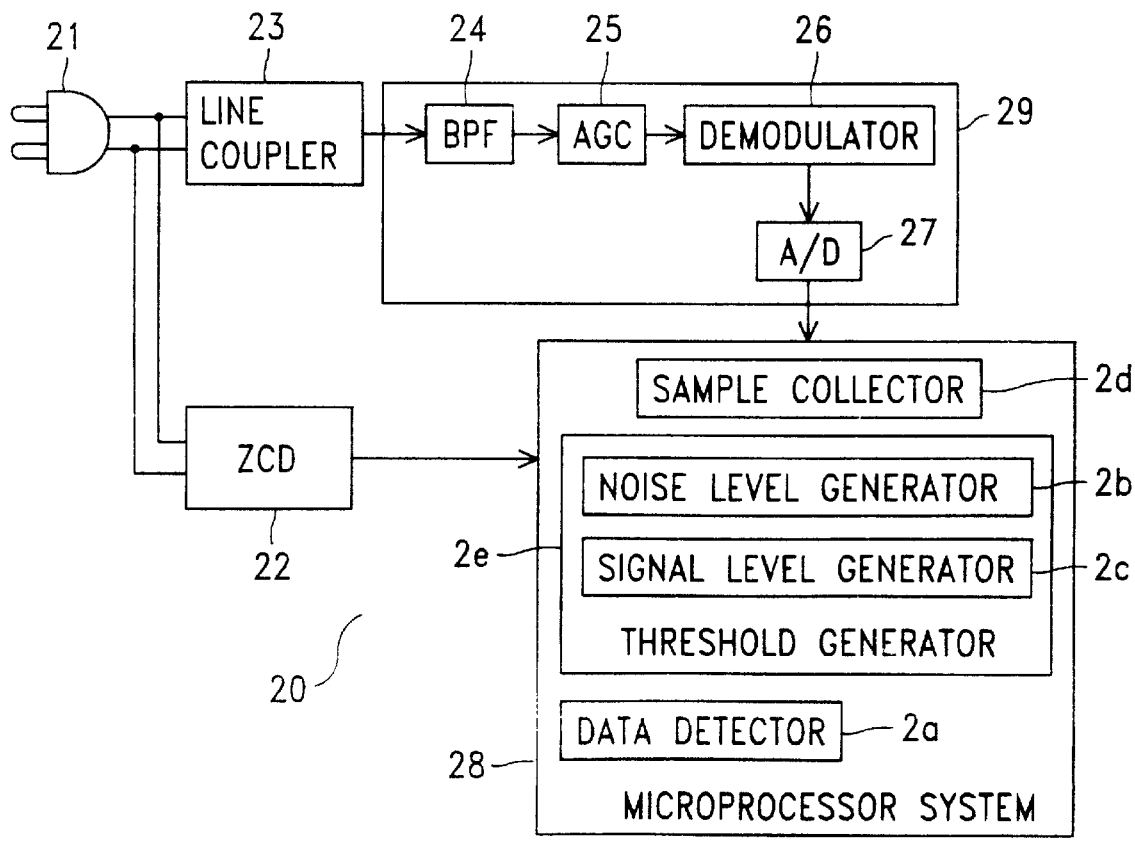
FIG. 2 is a circuit diagram of a powerline receiver according to the present invention.

Please refer to FIGS. 1 and 2 for the constructions of a powerline transmitter 10 and a powerline receiver 20 according to the present invention. FIG. 1 is a circuit diagram of a powerline transmitter 10 for transmitting amplitude-shift-keying (ASK) signals to a powerline. The transmitter 10 comprises a plug 11 for connecting a powerline (not shown), a zero crossing detector (ZCD) 12, a carrier signal counter 13 connected to an AND gate 14 for generating carrier signals, a microprocessor system 15 which controls the AND gate 14 through a control line CTL to generate ASK signals, an amplifier 16 and a line coupler 17. The ZCD 12 issues a SYNC signal to the microprocessor 15 when a zero crossing point of the powerline is detected. FIG. 2 is a circuit diagram of a powerline receiver 20 for receiving ASK signals from a powerline. The receiver 20 comprises a plug 21 for connecting a powerline (not shown), a zero crossing detector (ZCD) 22 for detecting zero crossing points of the powerline, a line coupler 23, a signal converter 29 for converting incoming signals into digital signals, and a microprocessor system 28. The signal converter 29 comprises a band pass filter (BPF) 24, an automatic gain controller (AGC) 25, a demodulator 26 for demodulating incoming signals into envelope signals and an analog-to-digital (A/D) converter 27 for digitizing the envelope signals into digital samples. An incoming ASK signal will first be demodulated into an envelope signal by the demodulator 26 and then digitized into digital samples by the A/D converter 27.

The microprocessor system 28 comprises three programs: sample collector 2d for collecting digital samples received from all the bit periods of one data period, threshold generator 2e for generating an adaptive threshold for each bit period, and data detector 2a for converting the digital samples of each bit period into a data bit by using the adaptive threshold of that specific bit period. The threshold generator 2e further comprises two sub-programs: noise level generator 2b for generating an average noise level for each bit period and signal level generator 2c for generating an average signal level for each bit period. The adaptive threshold of each bit period is generated by using the average noise and signal levels of each bit period and it is approximately equal to the average of the average noise and signal levels of each bit period.

Figure 3:
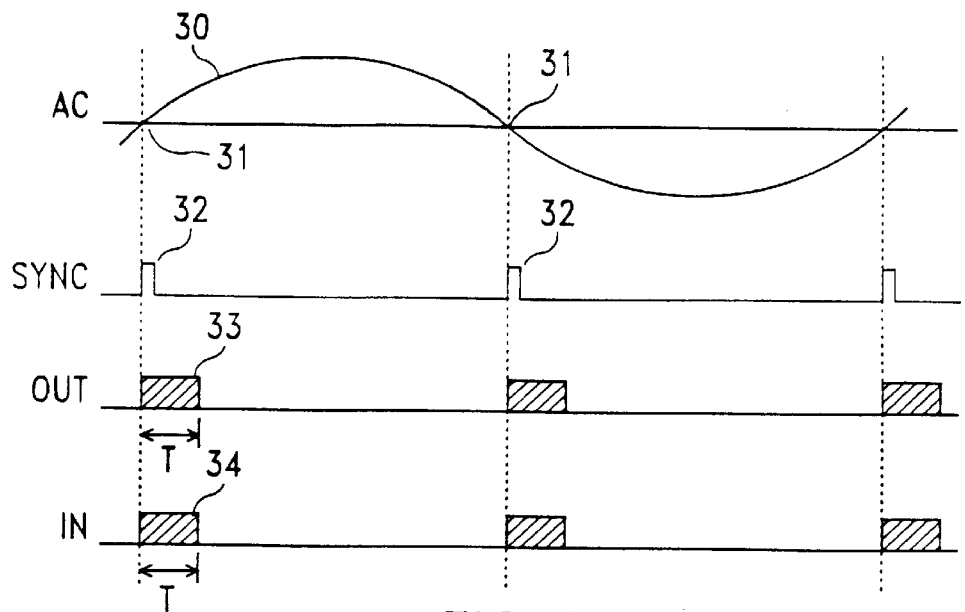
FIG. 3 is a timing diagram which shows the timing for transmitting and receiving data signals.

FIG. 3 is a timing diagram which shows the timing for transmitting and receiving data signals. From numerous field testing, a clear zone is found near each zero crossing point of an AC powerline which comprises much less noises in it. This clear zone is approximately equal to the duration of the voltage of a 120 volts AC powerline changing from 0 to +12/−12 volts or to the operating voltage of a halogen lamp adapter which comprises a switching AC (alternating current) to DC (direct current) converter. The halogen lamp adapter usually causes a lot of noises in a powerline network. The clear zone is used as a window for transmitting and receiving data signals by both the transmitter 10 and receiver 20.

FIG. 3 shows an alternating current (AC) 30 from a 60 Hz powerline. For each zero crossing point 31, a SYNC signal 32 is generated by the ZCD 12 of the transmitter 10 and also by the ZCD 22 of the receiver 20. In the transmitter side, after a SYNC signal 32 is generated by the ZCD 12, the microprocessor system 15 starts transmitting a sequence of ASK signals in one data period 33 which is within the clear zone of the powerline. In the receiver side, after a SYNC signal 32 is generated by the ZCD 22, the microprocessor system 28 starts receiving a plurality of digital samples converted by the A/D converter 27 throughout the data period 34 which is equal to the data period 33.

Figure 4:
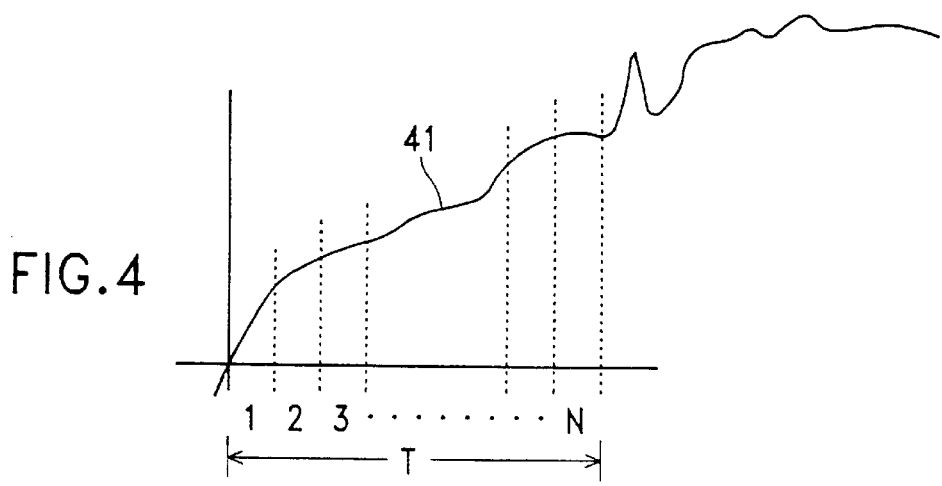
FIG. 4 shows an enlarged data period T which comprises a periodic noise in it.
Figure 5:
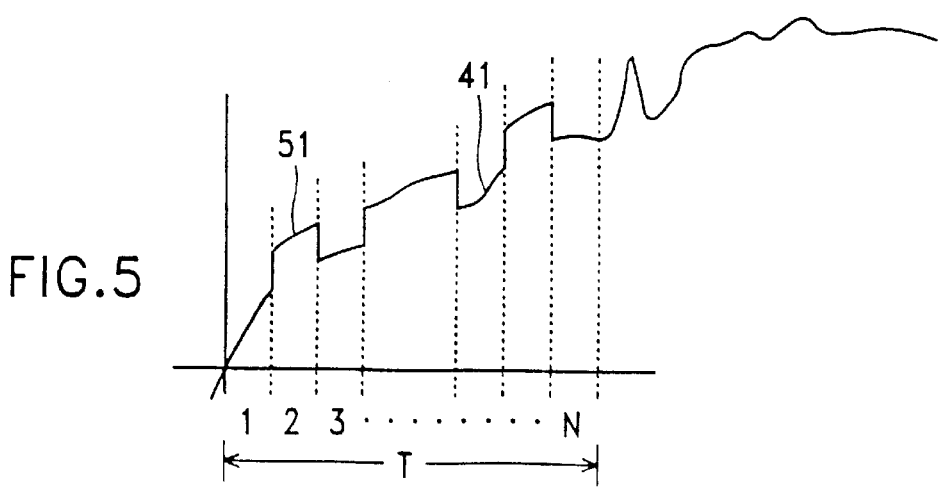
FIG. 5 shows several ASK signals coupled with the periodic noise within the data period T.

FIG. 4 shows an enlarged data period T which comprises a periodic noise 41 in it and FIG. 5 shows several ASK signals 51 coupled with the periodic noise 41 within the same data period T. The data period T is equally divided into N bit periods. When transmitting signals from the transmitter 10, each ASK signal is issued by the microprocessor system 15 by turning on or off of the AND gate 14. If the AND gate 14 is turned on by the control line CTL within a specific bit period, the carrier signal generated by the counter 13 will pass through the gate 14 and becomes a logic 1 ASK signal. Otherwise the gate 14 will be turned off when a logic 0 is to be transmitted. In the receiver side, each bit period will be digitized by the signal converter 29 into digital samples and collected separately for further analysis.

Figure 6:
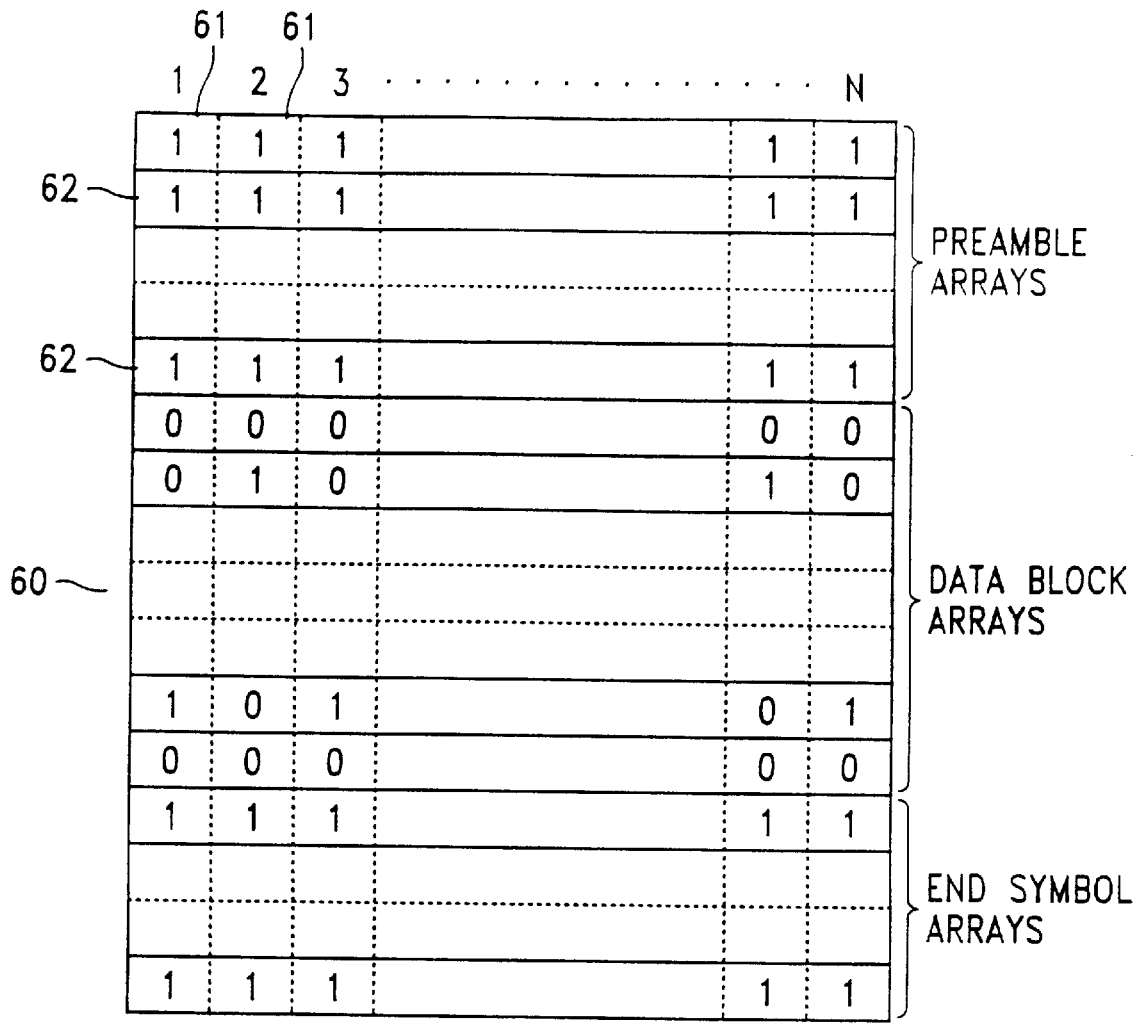
FIG. 6 shows the structure of a data packet according to the present invention.

FIG. 6 shows the structure of a data packet 60 used for transmitting data between the transmitter 10 and receiver 20. The data packet 60 comprises N bit columns 61 and multiple bit array 62. Each bit array 62 comprises N data bits in it. The data packet 60 will be transmitted in a array-by-array sequence. Each bit array 62 is transmitted in one data period, and each bit column 61 is transmitted through a specific bit period of the data period. For example, all the data bits of the ith bit column will be transmitted through the ith bit periods of a plurality of consecutive data periods. The data packet 60 is divided into three parts: preamble arrays, data block arrays and end symbol arrays. There are totally P preamble arrays in one data packet and each preamble array comprises N logic 1 bits. The end symbol arrays are made the same as the preamble arrays for control purpose.

Figure 7:
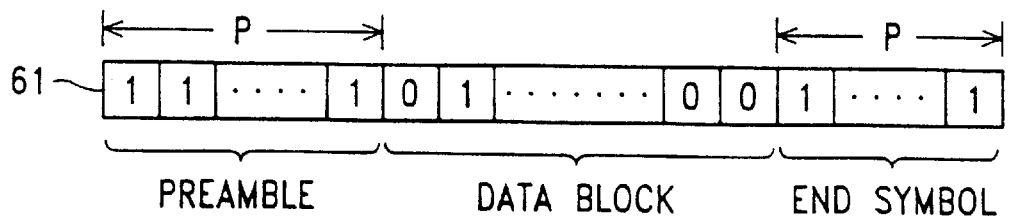
FIG. 7 shows the structure of a bit column of the data packet shown in FIG. 6.

FIG. 7 shows the structure of a bit column 61 of the data packet 60. The bit column 61 comprises three sections: preamble, data block and end symbol. The preamble and the end symbol both comprise P logic 1 bits. The data block comprises a plurality of data bits. In order to differentiate the preamble and end symbol with the data block, a data transparency policy is maintained in the data block which guarantees that the number of consecutive logic 1 bits contained in the data block is not greater than a maximum length Q and the number Q is smaller than the length of one preamble P. This can be done by inserting a logic 0 bit array after every Q data bit arrays and also at the beginning and at the end of the data block arrays when preparing the data packet 60 for transmission.

Figure 8:
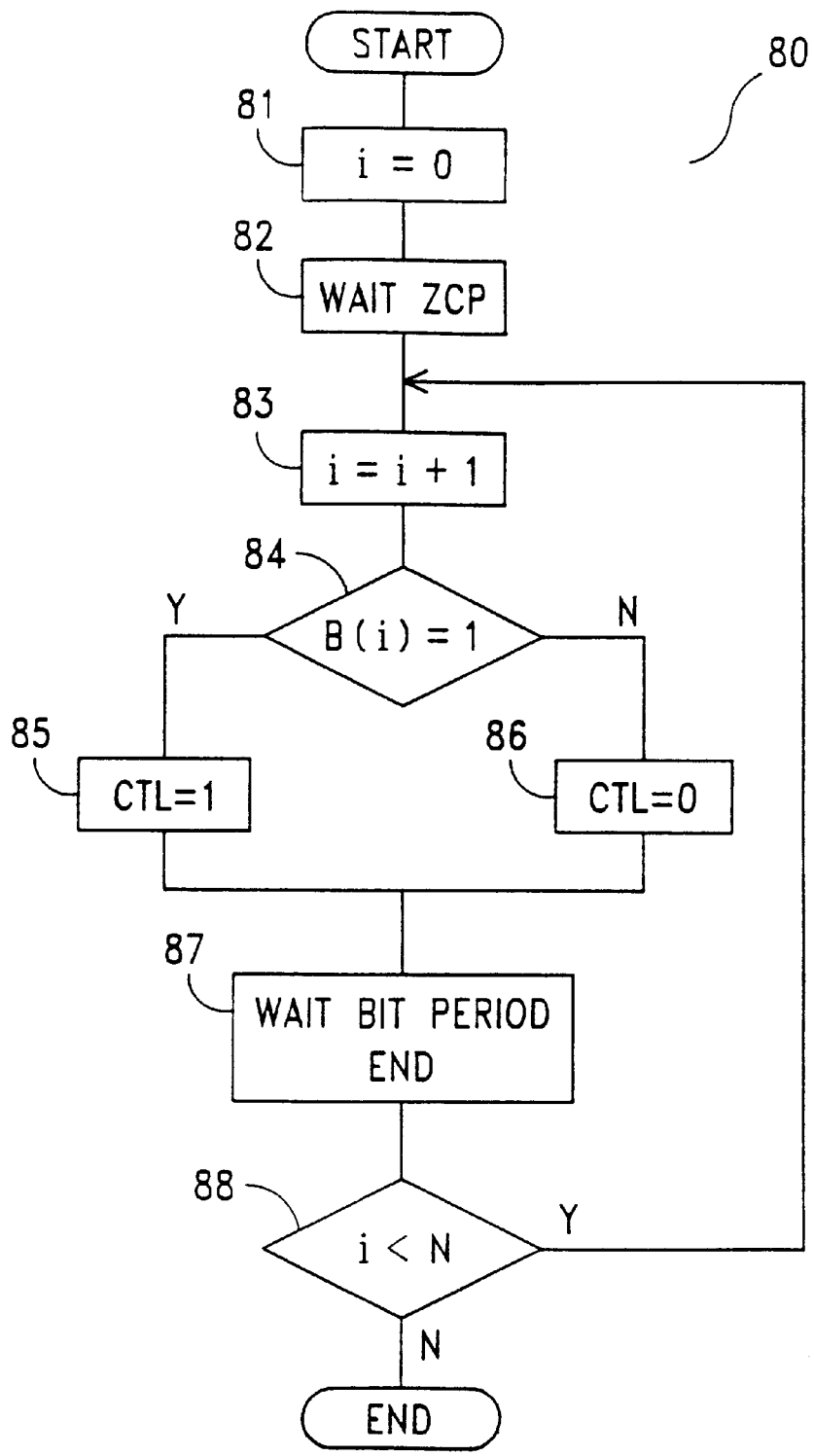
FIG. 8 is a bit array transmission process of the present invention.

FIG. 8 is a bit array transmission process 80 executed by the microprocessor system 15 of the transmitter 10 for transmitting one bit array 62 within one data period. The data bits of the bit array are represented by the symbol B(i), i=1 . . . N.

Step 81 set i=0
Step 82 wait until a zero crossing point (ZCP) is detected
Step 83 set i=i+1
Step 84 check if B(i)=1
Step 85 if yes, set CTL=1
Step 86 if no, set CTL=0
Step 87 wait until the end of current bit period
Step 88 if i<N, go to step 83

Figure 9:
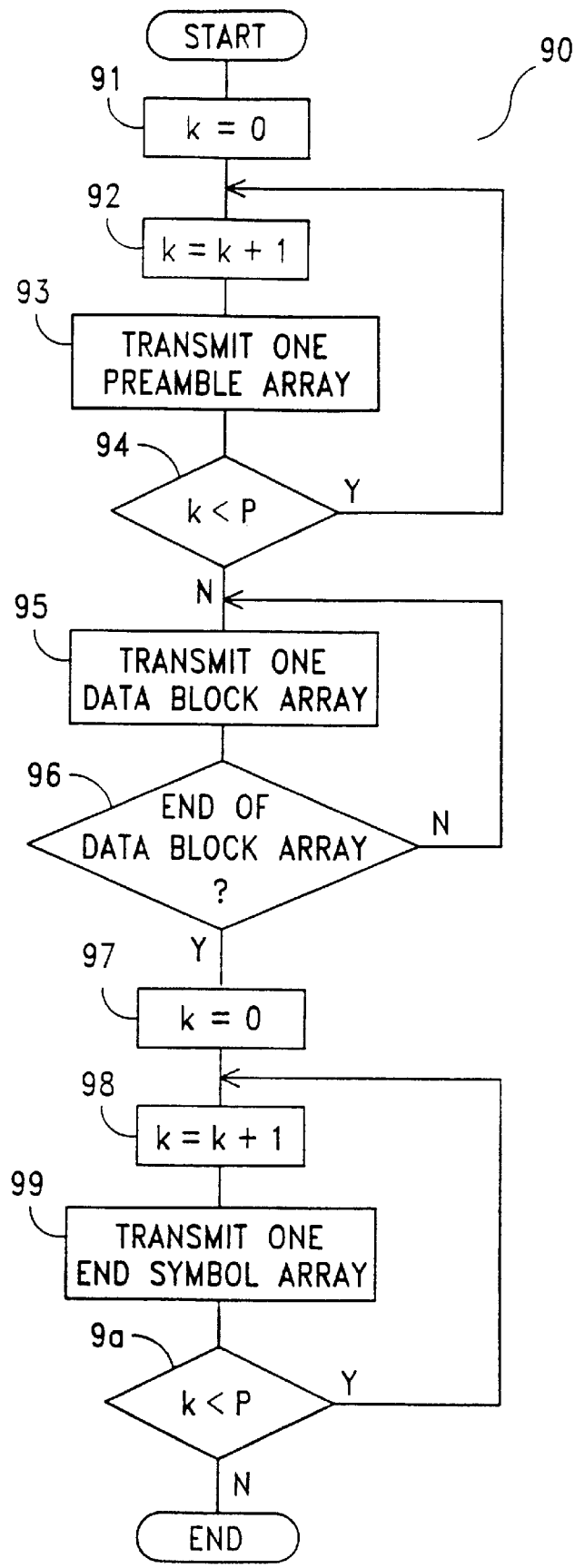
FIG. 9 is a data packet transmission process of the present invention.

FIG. 9 is a data packet transmission process 90 executed by the microprocessor system 15 of the transmitter 10 for transmitting one data packet 60. The process 80 is used for transmitting all the bit arrays in this process.

Figure 10:
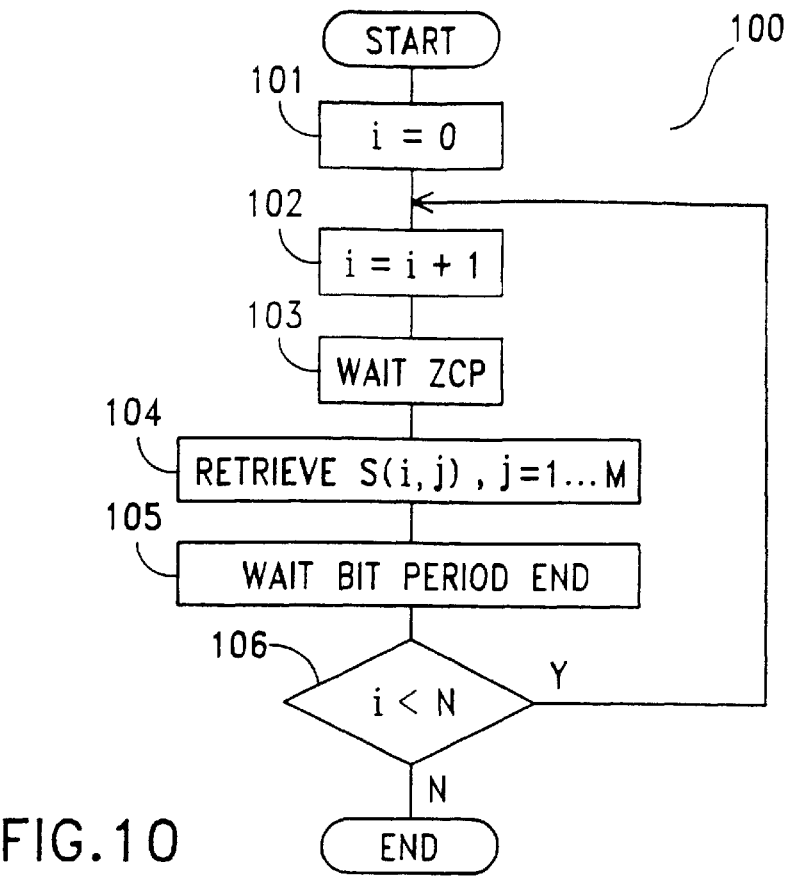
FIG. 10 is a digital sample collection process of the present invention.

Step 91 set k=0
Step 92 set k=k+1
Step 93 transmit a preamble array B(i)=1, i=1 . . . N
Step 94 go to step 92 if k<P
Step 95 transmit a data block array
Step 96 repeat step 95 until all the data block arrays are transmitted
Step 97 set k=0
Step 98 set k=k+1
Step 99 transmit an end symbol array B(i)=1, i=1 . . . N
Step 9a go to step 98 if k<P FIG. 10 is a digital sample collection process 100 used by the sample collector 2d of the receiver 20 for collecting digital samples received from all the bit periods of one data period. It collects M digital samples for each of the N bit periods of the data period and store all the digital samples in a matrix S(i,j), i=1 . . . N, j=1 . . . M.

Step 101 set i=0
Step 102 set i=i+1
Step 103 wait until a zero crossing point (ZCP) is detected
Step 104 retrieve M digital samples S(i,j), j=1 . . . M
Step 105 wait until the end of current bit period
Step 106 if i<N, go to step 103

Figure 11:
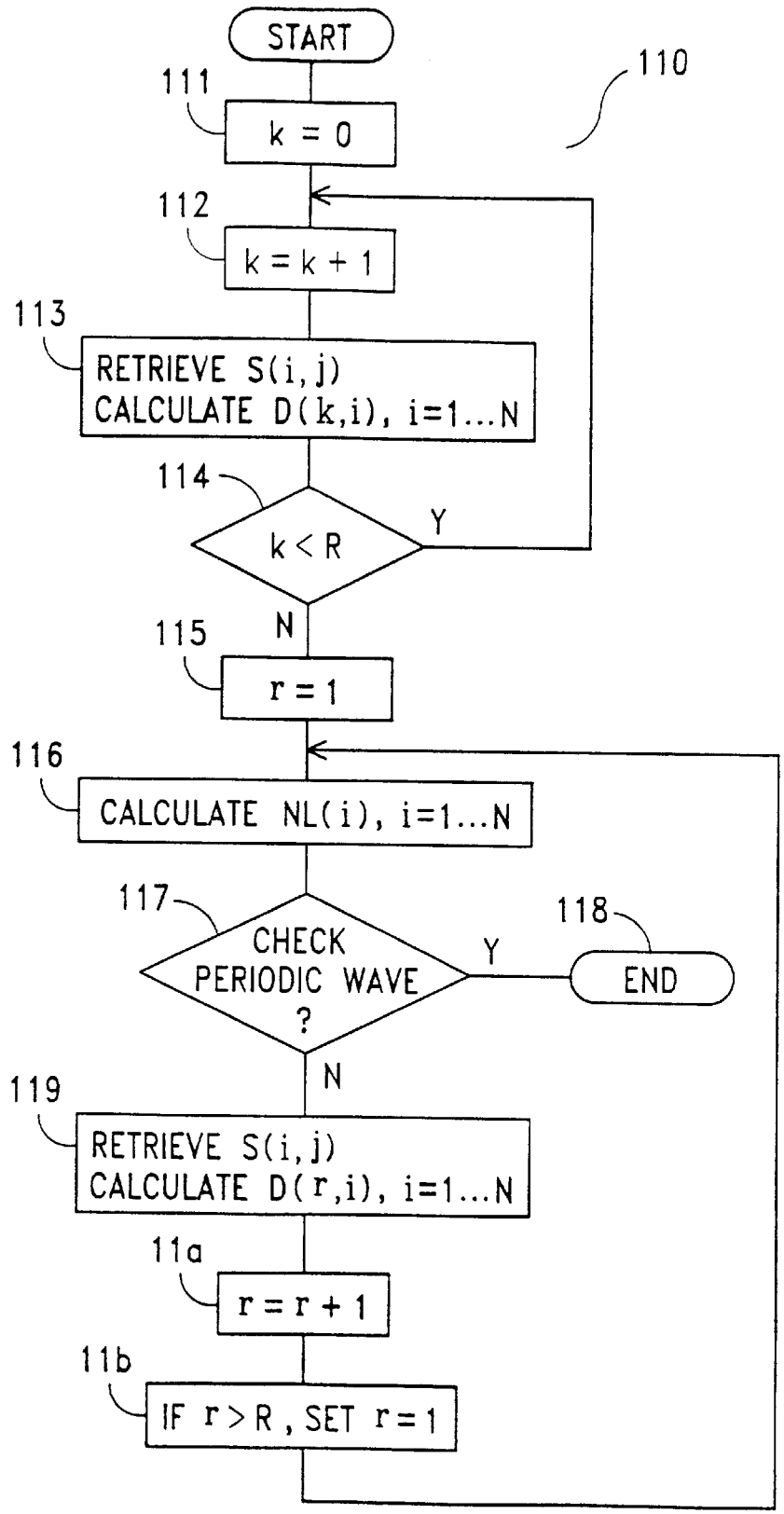
FIG. 11 is an average noise level generation process of the present invention.

FIG. 11 is an average noise level generation process 110 used by the noise level generator 2b of the receiver 20 for generating an average noise level for each of the N bit periods. The process 110 continuously checks the last R consecutive data periods until it finds a periodic wave such as the periodic wave 41 shown in FIG. 4 existed in all these data periods, and then obtains an average noise level for each of the N bit periods from the last R consecutive data periods.

When calculating the average noise levels, the average values of each of the bit periods of the last R data periods are stored in a matrix D(k,i), k=1 . . . R, i=1 . . . N and the average noise levels of all the bit periods are stored in a noise level array NL(i), i=1 . . . N. In process 110 the matrix D(k,i), k=1 . . . R, i=1.N is used as a ring queue and the variable r is used as a pointer for pointing the oldest entry (row) of the matrix. In finding a periodic wave from the last R data periods, a predetermined limit dl is set for checking the difference between one noise level NL(i) and all the average values D(k,i), k=1 . . R, of a bit period i. If the difference between one noise level NL(i) and any of the average values D(k,i), k=1 . . . R, of a bit period i is less than d1, and this condition is matched for all the N bit periods, a periodic wave is deemed existed and the value NL(i) represents the average of the periodic wave existed in bit period i.

Since ASK signals are used for transmitting data bits, the average noise level of each bit period is equivalent to a logic 0 and the average signal level of each bit period is equivalent to a logic 1. In order to make sure that a periodic wave can be accurately caught from the last R data periods for calculating the average noise levels of all the bit periods and no logic 1 bits are included in the last R data periods, the number R is made larger than the length P of one preamble so that it is impossible to collect R continuous logic 1 bits from one preamble or one end symbol because R>P. And since a data transparency is maintained in each data block which is explained in FIG. 7, it is also impossible to collect R continuous logic 1 bits from one data block because R>P>Q.

Step 111 set k=0
Step 112 set k=k+1
Step 113 retrieve M digital samples S(i,j), j=1 . . . M, for each of the N bit periods of one data period and calculate an average for each bit period:

$$D(k, i) = \frac{\sum_{j=1}^{M} S(i, j)}{M}, i = 1 \ldots N$$

Step 114 if k<R, go to step 112
Step 115 set r=1
Step 116 calculate a noise level NL(i) for each bit period of the last R data periods:

$$NL(i) = \frac{\sum_{k=1}^{R} D(k, i)}{R}, i = 1 \ldots N$$

Step 117 check if the noise levels NL(i), i=1 . . . N, of a periodic wave is found:

$$|NL(i)-D(k, i)|<d1, i=1\ldots N, k=1\ldots R$$

Step 118 if yes, finish the process
Step 119 retrieve M digital samples S(i,j), j=1 . . . M, for each of the N bit periods of one data period and calculate an average for each bit period:

$$D(r, i) = \frac{\sum_{j=1}^{M} S(i, j)}{M}, i = 1 \ldots N$$

Step 11a set r=r+1
Step 11b if r>R, set r=1
Step 11c go to step 116

Figure 12:
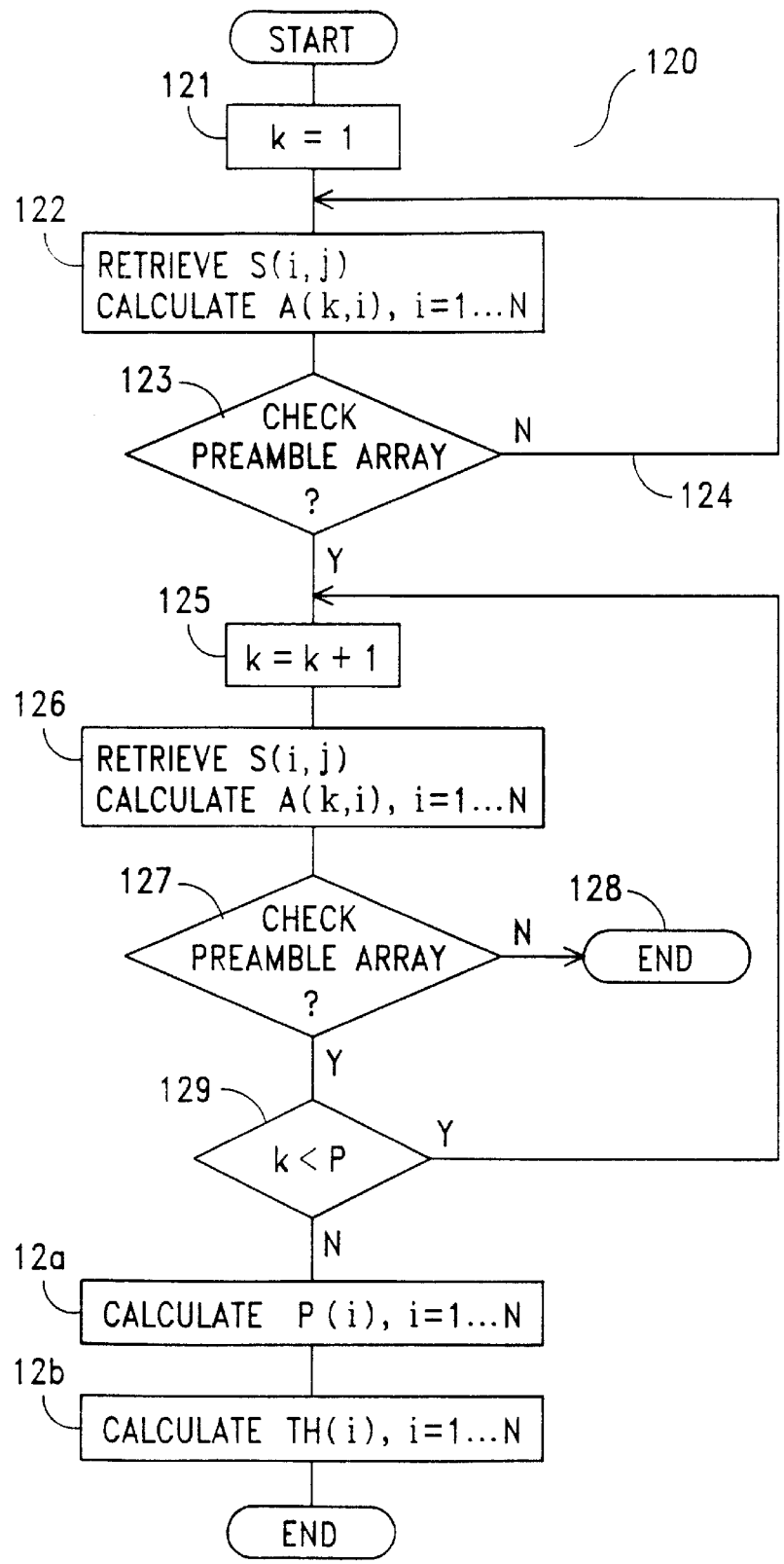
FIG. 12 is an average signal level generation process of the present invention.

FIG. 12 is an average signal level generation process 120 used by the signal level generator 2c of the receiver 20 which will generate an average signal level P(i) for each bit period by using the average noise level NL(i), and then generates an adaptive threshold TH(i) for each bit period which is approximately equal to the average of the average noise level NL(i) and the average signal level P(i). A preamble array is identified by comparing the average of each bit period with its average noise level plus a predetermined limit d2 which is approximately equal to one fifth of a data signal. If the average of each bit period is larger than its average noise level plus d2, a preamble array is found. All the following (P−1) preamble arrays will further be checked and collected for calculating the average signal level of each bit period.

Step 121 set k=1
Step 122 retrieve M digital samples S(i,j), j=1 . . . M, for each of the N bit periods of one data period and calculate an average for each bit period:

$$A(k, i) = \frac{\sum_{j=1}^{M} S(i, j)}{M}, i = 1 \ldots N$$

Step 123 check if the current array is a preamble array:

$$|A(k,i)-NL(i)|>d2, i=1 \ldots N$$

Step 124 if no, go to step 122
Step 125 set k=k+1
Step 126 retrieve M digital samples S(i,j), j=1 . . . M, for each of the N bit periods of one data period and calculate an average for each bit period:

$$A(k, i) = \frac{\sum_{j=1}^{M} S(i, j)}{M}, i = 1 \ldots N$$

Step 127 check if the current array is a preamble array:

$$|A(k,i)-NL(i)|>d2, i=1 \ldots N$$

Step 128 if no, finish the process
Step 129 if k<P, go to step 125
Step 12a calculate an average signal level P(i) for each bit period:

$$P(i) = \frac{\sum_{k=1}^{P} A(k, i)}{P}, i = 1 \ldots N$$

Step 12b calculate an adaptive threshold TH(i) for each bit period:

$$TH(i) = \frac{NL(i) + P(i)}{2}, i = 1 \ldots N$$

Figure 13:
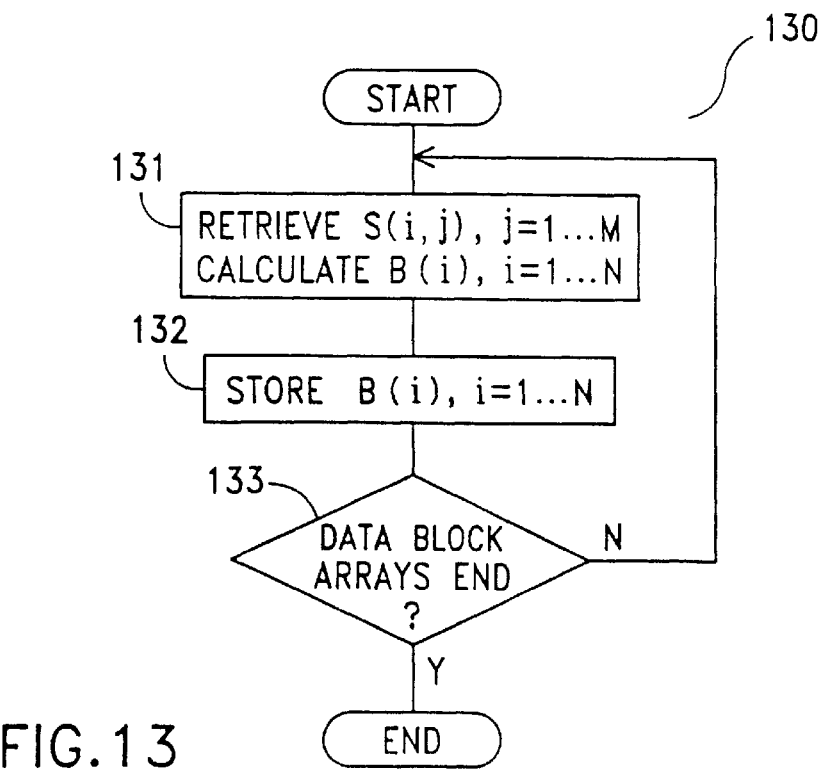
FIG. 13 is a data conversion process of the present invention.

FIG. 13 is a data conversion process 130 used by the data detector 2a of the receiver 20 which will convert all the data block arrays of a data packet detected by the process 120 into bit arrays by using the adaptive thresholds TH(i), i=1 . . . N, generated by the process 120. The digital samples of each bit period are averaged first and then compared with the adaptive threshold for generating one data bit. The process 130 is terminated when the end symbol arrays of the data packet are detected. Step 131 retrieve M digital samples S(i,j), j=1 . . . M, for each of the N bit periods of one data period and calculate a data bit B(i) for each bit period:

$$B(i) = 1 \text{ if } \frac{\sum_{j=1}^{M} S(i, j)}{M} > TH(i), \text{ otherwise } B(i) = 0, i = 1 \ldots N$$

Step 132 store the bit array B(i), i=1 . . . N, for further process

Step 133 repeat steps 131 and 132 until the end symbol arrays of the current data packet are detected The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A receiver for converting a modulated signal received from a media having a periodic wave in it into a data bit, a predetermined data period within each wave period of the periodic wave being used for data communications, each data period comprising at least one predetermined bit period and the modulated signal being received within said bit period of one data period, the receiver comprising:
    (1) synchronization means for synchronizing the periodic wave and generating a SYNC signal when a wave period is detected;
    (2) a signal converter for converting signals contained within said bit period of a data period after each SYNC signal into digital samples;
    (3) threshold means for generating an adaptive threshold according to the digital samples converted from said bit periods of a plurality of data periods; and
    (4) data detecting means for converting the digital samples converted from said modulated signal into the data bit by using the adaptive threshold.

2. The receiver of claim 1 wherein the media is a powerline having an alternating current as the periodic wave and wherein the synchronization means is a zero crossing detector for detecting zero crossing points of the powerline and generating the SYNC signal when a zero crossing point is detected.

3. The receiver of claim 2 wherein the predetermined data period is approximately equal to the duration for the voltage of the powerline changing from 0 volts to +12 volts or −12 volts.

4. The receiver of claim 2 wherein the predetermined data period is approximately equal to the duration for the voltage of the powerline changing from 0 volts to the operating voltage of a halogen lamp adapter.

5. The receiver of claim 1 wherein the digital samples converted from said modulated signal are averaged first and then compared with the adaptive threshold for generating the data bit.

6. The receiver of claim 1 wherein the modulated signal is an amplitude-shift-keying (ASK) signal and wherein the signal converter comprises a demodulator for demodulating the ASK signal into an envelope signal and an analog-to-digital (A/D) converter for digitizing the envelope signal into digital samples.

7. The receiver of claim 1 wherein the threshold means generates average noise and signal levels of said bit period first by using the digital samples of said bit periods of a plurality of data periods and then generates the adaptive threshold by using the average noise and signal levels.

8. The receiver of claim 7 wherein the adaptive threshold is approximately equal to the average of the average noise level and the average signal level of said bit period.

9. A method for converting a modulated signal received from a media having a periodic wave in it into a data bit, a predetermined data period within each wave period of the periodic wave being used for data communications, each data period comprising at least one predetermined bit period and the modulated signal being received within said bit period of one data period, the method comprising:
    (1) synchronizing the periodic wave and generating a SYNC signal when a wave period is detected;
    (2) converting signals contained within said bit period of a data period after each SYNC signal into digital samples;
    (3) generating an adaptive threshold according to the digital samples converted from said bit periods of a plurality of data periods; and
    (4) converting the digital samples converted from said modulated signal into the data bit by using the adaptive threshold.

10. The method of claim 9 wherein the media is a powerline having an alternating current as the periodic wave and the alternating current is synchronized by detecting its zero crossing points wherein the SYNC signal is generated when a zero crossing point is detected.

11. The method of claim 9 wherein the digital samples of said modulated signal are averaged first and then compared with the adaptive threshold for generating the data bit.

12. The method of claim 9 wherein the modulated signal is an amplitude-shift-keying (ASK) signal which is first demodulated into an envelope signal by a demodulator and then digitized into the digital samples by an analog-to-digital (A/D) converter.

13. The method of claim 9 wherein average noise and signal levels of said bit period are generated first by using the digital samples of said bit periods of a plurality of data periods and then the adaptive threshold is generated by using the average noise and signal levels.

14. The method of claim 13 wherein the adaptive threshold is approximately equal to the average of the average noise level and the average signal level of said bit period.

15. The method of claim 13 wherein the average noise level of said bit period is equivalent to a logic 0 of the data bit and the average signal level of said bit period is equivalent to a logic 1 of the data bit wherein a data transparency policy is maintained in said bit period which guarantees that the number of consecutive logic 1 bits transmitted through said bit periods is not greater than a maximum length.

16. The method of claim 15 wherein the average noise level of said bit period is generated by averaging the digital samples received from a first predetermined number of said bit periods, and wherein the difference between the average noise level and the average of the digital samples of each of the first predetermined number of bit periods is within a first predetermined limit, and wherein the first predetermined number is greater than the maximum length of the data transparency policy.

17. The method of claim 16 wherein the average signal level of said bit period is generated by averaging the digital samples received from a second predetermined number of said bit periods and the average of the digital samples of each of the second predetermined number of said bit periods is greater than the average noise level plus a second predetermined limit, and wherein the first predetermined number is greater than the second predetermined number which is in turns greater than the maximum length of the data transparency policy.

18. A receiver for extracting data from a modulated periodic signal propagated on a media, each cycle of said periodic signal having a data period with at least one bit period, the receiver comprising:

a synchronizer coupled to said media, wherein said synchronizer is configured to generate a SYNC signal when a period is detected;

a demodulator coupled to said media, wherein said demodulator is configured to provide an analog signal corresponding to a datum modulated on said periodic signal;

a converter coupled to said demodulator, wherein said converter is configured to provide a digital representation of said analog signal from said demodulator;

a sample collector coupled to said converter and said synchronizer, wherein said sample collector is configured to store said digital representation;

a threshold generator coupled to said sample collector, wherein said threshold generator is configured to provide an adaptive threshold dependent at least in part on said digital representation stored in said sample collector; and a detector coupled to said threshold generator and said sample collector, wherein said detector is configured to provide a data bit as a function of said digital representation and said adaptive threshold.

19. A receiver according to claim 18, wherein said threshold generator is further configured to generate average noise and signal levels of said bit period first by using the digital samples of said bit periods of a plurality of data periods and then generates the adaptive threshold by using the average noise and signal levels.

20. A receiver according to claim 18, wherein said adaptive threshold is approximately equal to the average of the average noise level and the average signal level of said bit period.

21. A receiver according to claim 18, wherein a microprocessor is used to implement said sample collector, said threshold generator and said detector.

* * * * *